US00RE33846E

United States Patent [19]

Kramer et al.

[11] E Patent Number: Re. 33,846

[45] Reissued Date of Patent: Mar. 17, 1992

[54] ELECTROHYDRAULIC VALVE SYSTEM

[75] Inventors: Kenneth D. Kramer; Edward H. Fletcher, both of Waterloo, Iowa

[73] Assignee: Deere & Company, Moline, Ill.

[21] Appl. No.: 468,346

[22] Filed: Jan. 22, 1990

Related U.S. Patent Documents

Reissue of:

[64] Patent No.: 4,437,385
Issued: Mar. 20, 1984
Appl. No.: 364,373
Filed: Apr. 1, 1982

[51] Int. Cl.[5] ..... F15B 13/043

[52] U.S. Cl. ..... 91/361; 91/363 R; 91/364; 91/429; 91/448; 91/457; 91/461

[58] Field of Search ..... 91/361, 363 R, 363 A, 91/364, 448, 454, 457, 461, 429

[56] References Cited

U.S. PATENT DOCUMENTS

| | | | |
|---|---|---|---|
| 1,666,748 | 4/1928 | Mickley | 91/454 X |
| 3,151,455 | 10/1964 | Tennis | 91/454 |
| 3,714,868 | 2/1973 | Kowalski et al. | 91/454 X |
| 3,954,046 | 5/1976 | Stillhard | 91/457 X |
| 4,250,794 | 2/1981 | Haak et al. | 91/454 X |
| 4,282,711 | 8/1981 | Branstetter | 60/395 |
| 4,316,486 | 2/1982 | Tandrup et al. | 91/459 X |

FOREIGN PATENT DOCUMENTS

| | | |
|---|---|---|
| 40075 | 8/1981 | European Pat. Off. . |
| 44263 | 9/1981 | European Pat. Off. . |
| 51-64190 | 6/1976 | Japan . |
| 52-29581 | 3/1977 | Japan . |
| 54-37378 | 1/1979 | Japan . |
| 54-90721 | 7/1979 | Japan . |
| 55-16489 | 4/1980 | Japan . |
| 55-119709 | 9/1980 | Japan . |

OTHER PUBLICATIONS

"Electrohydraulics for Remote Control", *Design Engineering*, Jun. 1981, pp. 57–63.

"Third Fluid Mechanism Colloquium at Aachen", 14 to 16 Mar. 1978, Contributions to the Field of Hydraulics, vol. 2, pp. 5 & 18.

Sperry/Vickers, "European Production Release", 15 & 29 Jan. 1981, pp. 1–5 of 19.

Sperry/Vickers, 4/12 Directional Control, 6 pages, date unknown.

*Primary Examiner*—John T. Kwon
*Assistant Examiner*—George Kapsalas

[57] ABSTRACT

A control system for controlling a double-acting cylinder includes four pilot-operated, proportional-type poppet valves for controlling fluid flow between the cylinder, a pump and a reservoir. Four solenoid-controlled pilot valves operate the poppet valves in response to error signals generated by a control circuit. The control circuit receives a cylinder position feedback signal and an operator-generated command signal. The control circuit provides for float, shutdown, variable deadband and pressure adjustment operation.

15 Claims, 2 Drawing Sheets

ELECTROHYDRAULIC VALVE SYSTEM

Matter enclosed in heavy brackets [ ] appears in the original patent but forms no part of this reissue specification; matter printed in italics indicates the additions made by reissue.

BACKGROUND OF THE INVENTION

This invention relates to an electrohydraulic valve system for controlling a fluid motor, such as a double-acting cylinder.

It is well known to control a fluid motor with a spool valve which is pilot-pressure controlled by an electrically operated pilot valve. Such valves have been proposed for use in closed loop fluid motor position control systems. However, such spool-type valves are susceptible to contaminants in the hydraulic fluid. Furthermore, such control systems must be designed to provide for smooth and stable operation when the system is controlling an overrunning load, such as when the fluid motor is lowering a heavy load. When this is done, however, the resulting control system is undesirably sluggish when controlling an underrunning load, such as when the fluid motor is lifting heavy loads. Another drawback of such valve systems is that complicated spools or additional valves are necessary to provide an operational mode wherein the fluid motor is allowed to float.

As an alternative to spool-type valves, it has also been proposed to control a double-acting cylinder via a four, on-off type poppet valve arrangement controlled by a pair of solenoid-operated pilot valves. Such a four-valve arrangement can provide for bi-directional cylinder movement, as well as cylinder float and lock functions. However, such on-off valves can produce undesirable high pressures when operating in a system having large fluid flow rates. Furthermore, in systems with high inertia, such on-off valves are prone to produce system instabilities, such as overshoot. Therefore, it would be desirable to provide a stable, closed-loop control valve system having the functional flexibility which is characteristic of four-poppet type valve arrangements.

SUMMARY OF THE INVENTION

An object of the present invention is to provide a control valve system for a double-acting cylinder which has similar operating characteristics during both overrunning and underrunning load conditions.

Another object of the present invention is to provide a control valve system which has functional flexibility.

A further object of the present invention is to provide a control valve system which is capable of operating in systems having high fluid flow rates and high inertias.

These and other objects are achieved by the present invention which includes four proportional-type poppet valves, each individually operated by a separate solenoid-operated pilot valve. The poppet valves control fluid flow between a double-acting cylinder, a pump and a sump. A position sensor sends a cylinder position feedback signal to a control circuit which also receives an operator-generated command signal which represents a desired cylinder position. The control circuit generates inverted and non-inverted velocity-compensated position error signals which are communicated to corresponding pairs of the solenoids via pulse-width modulating circuits. The control circuit includes features, such as variable deadband, pressure adjust, shutdown, float and dither.

DETAILED DESCRIPTION

Figure 1:
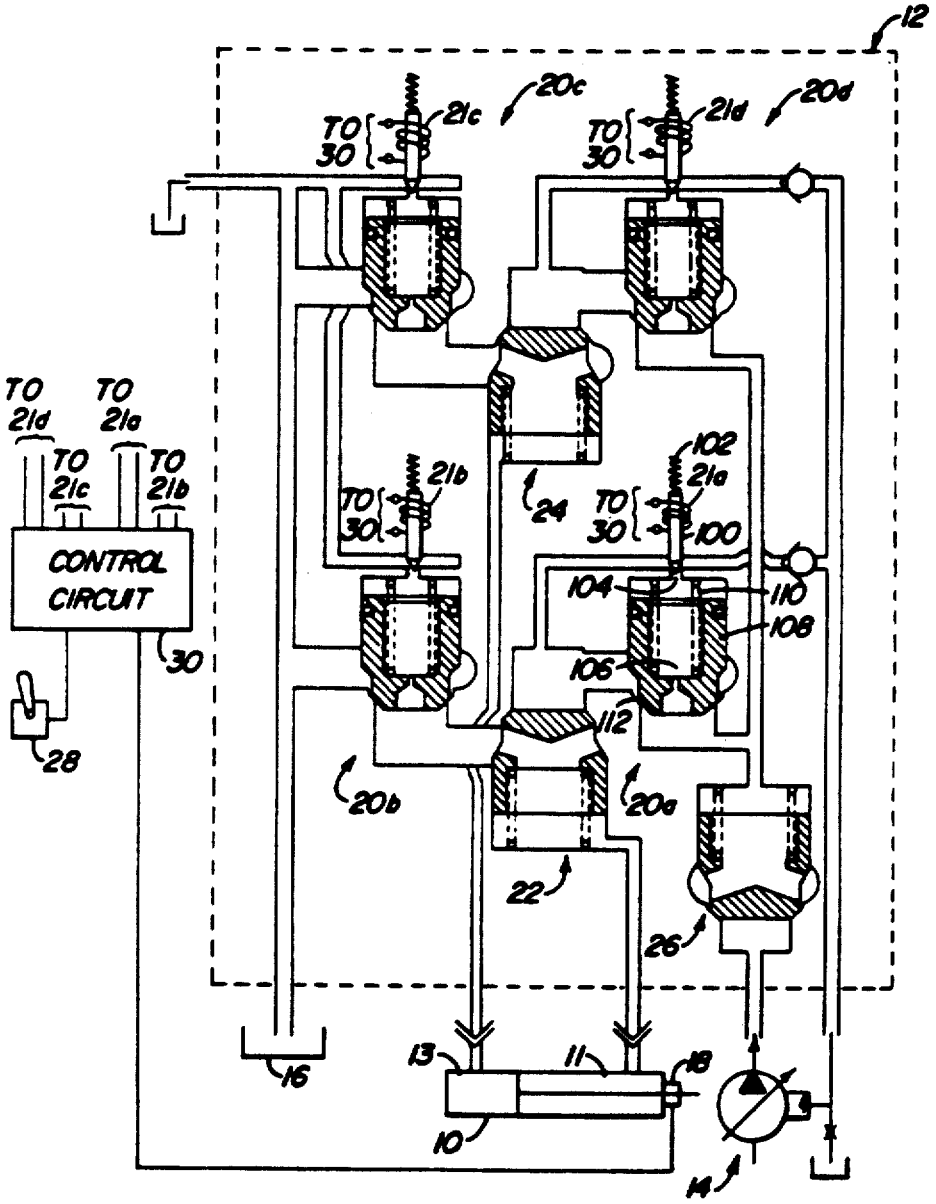
FIG. 1 is a simplified schematic diagram of a poppet valve control system constructed according to the present invention.

As shown in FIG. 1, a double-acting cylinder 10 is controlled by a valve system 12 coupled to a pump or source 14 of fluid pressure and a reservoir 16. The pump 14 is preferably a conventional pressure-on-demand type hydraulic pump or some other type of pressure source. The cylinder 10 includes a position feedback sensor or potentiometer 18, such as described in U.S. Pat. No. 3,726,191.

The valve system 12 includes four solenoid-controlled, pilot-operated poppet or pressure-reducing valves 20a–d. Pressure valve 20a controls fluid communication between the source 14 and a cylinder retraction chamber 11. Return valve 20b controls fluid communication between the sump 16 and cylinder [extension] *retraction* chamber [13] *11*. check valve 22 prevents flow from chamber 11 to valve 20a. Return valve 20c controls flow between chamber 13 and sump 16 while valve 20d controls flow between pump 14 and chamber 13. Check valve 24 prevents flow from chamber 13 to pressure valve 20d. [Pressure valve 20d controls flow from pump 14 to port 13.] Check valve 26 prevents flow reversal toward the pump 14.

Valves 20a–d are operated by solenoid coils 21a–d which are energized by control circuit 30. For example, when current is applied to the solenoid coil 21a, the armature 100 moves proportionally against the bias of spring 102 to open orifice 104. This causes a pressure differential to form across orifice 106 of valve body 108 causing valve body to move against the bias of spring 110 and away from seat 112, thus, proportionally opening valve 20a. Valves 20b–d operate in a like manner. The control circuit 30 generates the control signals as a function of a position signal X received from the transducer 18 on cylinder 10 and of a command signal C generated by an operator-controlled transducer 28, such as a potentiometer. The command signal c represents a desired position of the piston relative to the cylinder 10.

Figure 2:
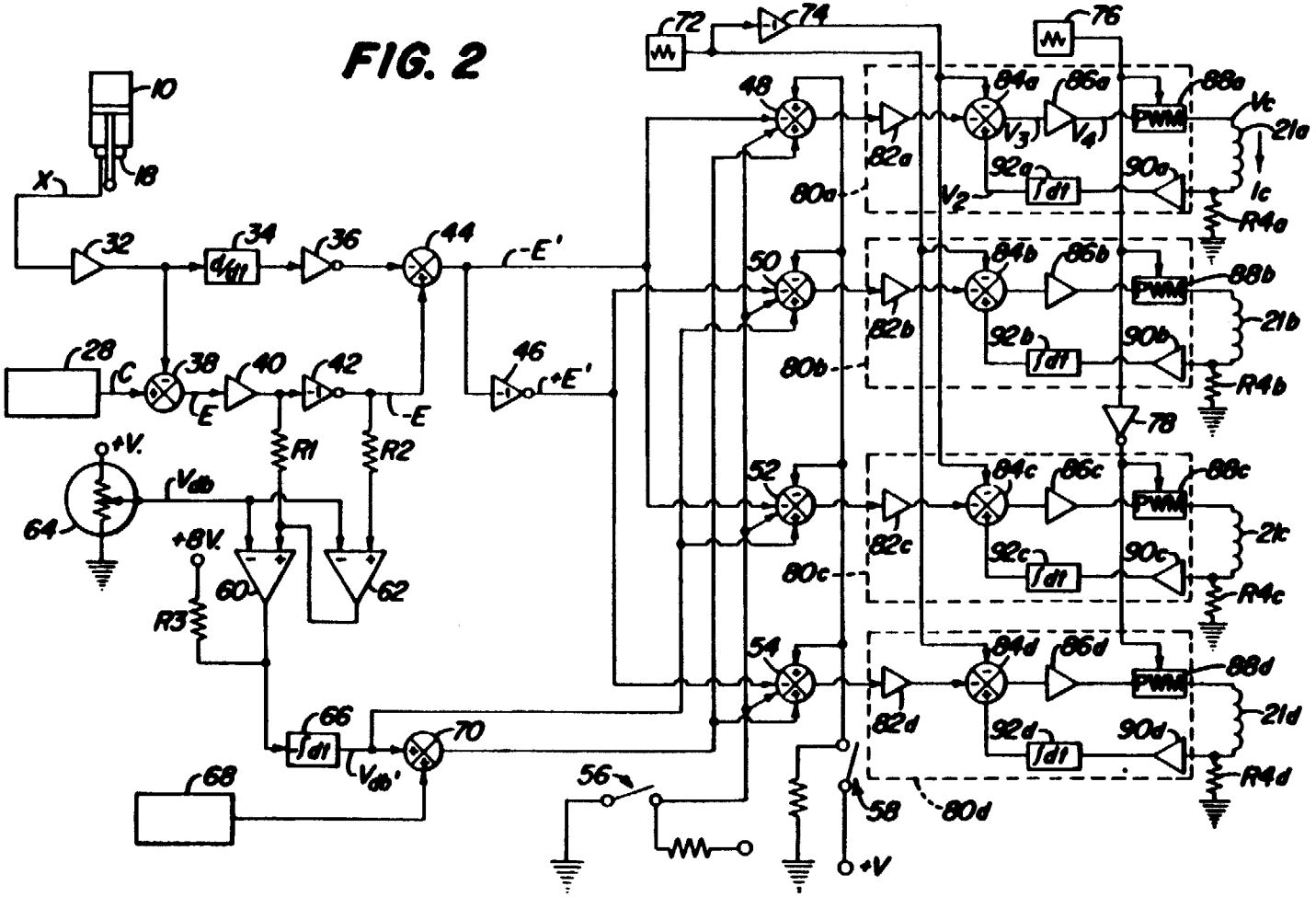
FIG. 2 is a schematic block diagram of the control circuit shown in FIG. 1.

Referring now to FIG. 2, the control circuit 30 includes a unity gain buffer amplifier 32 to buffer the position signal X from position transducer 18. Scaling amplifiers (not shown) may be needed to scale one or both of the positions X and command C signals to convert them to a single voltage range, for example, 0–8 volts. The position signal X is differentiated by a differentiator 34 and amplified by an inverting amplifier 36 with a gain of approximately −0.6.

An error signal E is generated by substracting the position signal X from the command signal C at subtracting junction 38. The error signal E is then amplified by amplifier 40 with a gain of approximately 2.0 and inverted by a unity gain inverting amplifier 42. A difference junction 44 includes a (−) input receiving the output of inverter 42 and a (−) input receiving the output of inverter 36. Thus, there appears at the output of difference junction 44 an inverted combined or velocity compensated error signal −E′. The inverted signal −E' is inverted by a unity gain inverting amplifier 46 to obtain a noninverted combined or velocity-compensated error signal +E'.

The error signals E and −E are coupled via corresponding pairs of arithmetic units 50, 54 and 48, 52, respectively, to corresponding pairs of identical solenoid coil driving circuits 80b, 80d and 80a, 80c, respectively. These circuits, for which a fuller description follows, operate to produce a 300 multi-amp variation in the coil-driving current, Ic, in the solenoid coils 21a–d in response to a 2.5 volt variation in the error signal output from difference junction 44. The (−) inputs of arithmetic units 48 and 52 both receive the inverted error signal −E', while the (−) inputs of arithmetic units 50 and 54 both receive the non-inverted error signal +E'.

The (−) inputs of arithmetic units 48–54 also receive a low or high level shutdown signal from an operator-controlled bistable device 56, such as a switch. A low level signal from switch 56 de-energizes all of coils 21a–d and closes all the valves 20a–d, thus providing a shutdown feature.

Another operator-controlled bi-stable device, such as a switch 58, provides a high or low level signal which is applied to the (+) inputs of arithmetic units 48 and 54 and to the (−) inputs of arithmetic units 50 and 52. Thus, the operator may close switch 58 to de-energize and close pressure valves 20a and 20d while energizing and opening return valves 20b and 20c, thus placing the motor 10 in a "float" condition.

The error signal E from amplifier 40 is coupled via resistor R1 to the (+) input of a comparator 60. The inverted error signal −E from inverter 42 is coupled via resistor R2 to the (+) input of comparator 62. The (−) inputs of comparators 60 and 62 are both coupled to the adjustable contact of a variable potentiometer 64 which generates a variable deadband voltage, Vdb. The output of comparator 62 is coupled to the (+) input of comparator 60. The signal at the output of comparator 60 will be high, except when the error voltages E or −E are within a deadband range whose width is determined by the level of the deadband voltage, Vdb, from potentiometer 64. The output of comparator 60 is coupled to +8 volts via pull-up resistor R3 and to an input of an integrator 66 with an inverting gain factor of −0.3. The integrator 66 ramps its output up or down between voltage limits in response to the abrupt changes in the output of comparator 60. The integrator 66 also inverts to provide an inverted deadband signal, Vdb, which is low unless the error voltages E and −E are within the previously mentioned deadband range. The inverted deadband signal, Vdb', is applied to the (+) inputs of difference junctions 50 and 52 to de-energize the coils 21b and 21c and close return valves 20b and 20c when the error signals E or −E are in the deadband range.

A conventional pressure sensor 68, which may be located to sense the output pressure from the pump 14, generates a pressure adjust signal, Vpa, which is proportional to the pump outlet pressure. The Vpa signal is added to the Vdb' deadband signal at summing junction 70 and the sum of these signals is applied to the (+) inputs of summing junctions 48 and 54. Thus, when the outlet pressure of pump 14 increases, the pressure sensor 66 increases signal Vpa, thereby causing a proportional reduction in the level of energization of coils 21a and 21d and a proportional closing of pressure valves 20a and 20d. This proportional closing of valves 20a and 20d increases the pressure drop across these valves and compensates for the original increase in the pump pressure. Conversely, decreases in pump pressure are compensated by a proportional opening of pressure valves 20a and 20d.

The outputs of summing junctions 48–54 are coupled to identical circuits 80a–d, one of which will be described in detail. Circuit 80a includes an amplifier 82a, with a gain of approximately 0.8, which amplifies the output of summing junction 48. This amplified error signal is applied to a (−) input of a summing junction 84a. The other (−) input of junction 84a receives an inverted 200 Hz triangle wave dither signal from dither oscillator 72 and inverter 74.

The ouput V3 of junction 84a is coupled to amplifier 86a, with a gain of approximately 20, which generates signal V4 which is then applied to an input of pulse width modulator (PWM) 88a. Modulator 88a also receives a non-inverted 3000 Hz triangle-wave signal from PWM oscillator 76. The modulated output Vc of PWM 88a is a 3000 Hz square wave voltage with a duty cycle or % modulation equal to $100\times((V4-1.26)/(3.93-1.26))$, where 3.93 and 1.26 are the high and low peak values of the signal from PWM oscillator 72. The output Vc is applied to one end of coil 21a.

The other end of coil 21a is coupled to ground via current sensing resistor R4a and to the (+) input of junction 84a via amplifier 90a and integrator 92a. Amplifier 90a has a gain of approximately 2.84, for example. The integrator 92a also receives a reference voltage, Vref=3.43 volts, and produces a voltage V2 defined by the LaPlace Transform Transfer Equation, $V2=2Vref-V1\,(6250/(S+6250)$, where V1 is the voltage at the output of amplifier 90a. The overall effect of circuit 80a is to energize the coil 21a with a driving current, Ic, which is proportional to the combined signal from arithmetic unit 48. The feedback provided by amplifier 90a and 92a reduces the effect of variations in supply voltage and in the resistance of coil 21a and provides an increased frequency response for the system.

Note that while the (−) inputs of junctions 84a and 84c receive the inverted dither signal, the (−) inputs of junctions 84b and 84d receive the non-inverted dither signal. Thus, the dither signal puts the operation of valves 20a and 20c out of phase with respect to valves 20b and 20d. This prevents simultaneous opening of pressure valve 20a and return valve 20b and similarly, of pressure valve 20d and return valve 20c to prevent flow from bypassing the cylinder 10 by flowing directly from pump 14 to reservoir 16. This reduces the flow required to provide the equivalent pressure regulation which could be obtained without dither.

Note also that while PWMs 88a and 88b receive a non-inverted PWM oscillator signal, the PWMs 88c and 88d each receive an inverted PWM oscillator signal via inverter 78. Thus, the two pairs of valves are alternately pulsed, rather than simultaneously pulsed, to reduce the peak demand upon the power supply (not shown).

This system operates to produce a differential pressure drop across the valves 20a–d which is inversely proportional to the magnitude of the coil current, Ic. By controlling the pressure drops across the valves 20a–d, the fluid pressure communicated to the ports 11 and 13 is controlled to extend or retract the piston relative to the cylinder 10, as desired. For example, when the command transducer 28 is moved to extend the cylinder 10, a positive non-inverted error signal, E, is generated. Note that when E is positive, the inverted error signal −E is negative and no current is generated in solenoid coils 21a and 21c so that valves 20a and 20d remain closed. This positive E signal causes circuits 80b and 80d to generate coil currents in solenoids coils 21b and 21d, thereby opening valves 20b and 20d to apply a proportional pressure differential across the piston of cylinder 10 and causing the cylinder 10 to extend to a new position corresponding to the position command signal C generated by the command transducer 28. Conversely, when the transducer 28 commands cylinder retraction, the inverted error signal −E goes positive, while the non-inverted error signal goes negative. This opens valves 20a and 20c while closing valves 20b and 20d, thus retracting the cylinder 10, as desired. The velocity feedback provided by differentiator 34 increases the overall stability of the control system.

We claim:

[1. A system for controlling a double-acting hydraulic cylinder having extension and retraction chambers separated by a piston in the cylinder, comprising:

a valve assembly comprising a first pilot-operated proportional-type poppet valve for controlling fluid communication between pump and the retraction chamber, a second pilot-operated proportional-type poppet valve for controlling fluid communication between the retraction chamber and a reservoir, a third pilot-operated proportional-type poppet valve for controlling fluid communication between the extension chamber and the reservoir and a fourth pilot-operated proportional-type poppet valve for controlling fluid communication between the pump and the extension chamber;

a plurality of solenoid-operated pilot valves, each pilot valve operating one of the poppet valves;

position-sensing means for sensing the position of the cylinder and for generating a feedback signal indicative thereof;

operator-controlled means for generating a command signal representing a desired position of the piston relative to the cylinder; and control circuit means for generating an error signal derived from the feedback and command signals and for energizing selected ones of the pilot valves to operate corresponding ones of the poppet valves to move the cylinder and reduce the magnitude of the error signal.]

[2. The invention of claim 1, wherein the control circuit comprises:

differentiating means for converting the feedback signal to a velocity signal indicative of the velocity of the piston relative to the cylinder;

difference means for generating the error signal representing a difference between the command and feedback signals;

means for generating a compensated error signal representing a difference between the error signal and the velocity signal;

inverting means for converting the compensated error signal to an inverted compensated error signal;

a first pair of driver circuits receiving the compensated error signal for driving a corresponding first pair of the pilot valves in response thereto; and a second pair of driver circuits receiving the inverted compensated error signal for driving a corresponding second pair of the pilot valves in response thereto.]

3. The invention of claim [2] *21*, wherein each driver circuit comprises:

modulating means for converting the received error signal to a pulse-width modulated driving signal having a duty cycle corresponding to the magnitude of the received error signal.

4. The invention of claim 3, wherein:

the modulated driving signal generated by one of the driver circuits of the first pair of driver circuits is 180 degrees out of phase with the modulated driving signal generated by the other driving circuit of the first pair of driver circuits, and the modulated driving signal generated by one of the driver circuits of the second pair of driver circuits is 180 degrees out of phase with the modulated driving signal generated by the other of the second pair of driver circuits.

5. The invention of claim [2] *21*, further comprising:

means for converting the error signal to an inverted error signal;

operator-controlled means for generating a variable deadband reference signal;

a deadband circuit for receiving the error signal, the inverted error signal and the deadband reference signal and for generating a deadband adjust signal as a function thereof;

means for combining the deadband adjust signal with the compensated error signal to provide a first combined signal which is received by one of the first pair of driver circuits; and means for combining the deadband adjust signal with the inverted compensated error signal to provide a second combined signal which is received by one of the second pair of driver circuits.

6. The invention of claim [2] *21*, further comprising:

operator-controlled means for generating a float signal; and means for combining the float signal with signals received by all the driver circuits, thereby energizing a selected pair of the pilot valves to open a corresponding pair of the poppet valves controlling fluid communication between the sump and the cylinder, and thereby de-energizing a selected pair of the pilot valves to close a corresponding pair of the poppet valves controlling fluid communication between the pump and the cylinder.

7. The invention of claim [2] *21*, further comprising:

operator-controlled means for selectively generating a shutdown signal; and means for combining the shutdown signal with the signals received by all the driver circuits, generation of the shutdown signal causing de-energization of all the pilot valves to close all the poppet valves and prevent movement of the cylinder.

8. The invention of claim [2] *21*, further comprising:

a dither oscillator for generating a dither signal having a predetermined frequency;

inverter means for converting the dither signal to an inverted dither signal which is 180 degrees out of phase with the dither signal;

means for combining the dither signal with the signals received by the pilot valves operating the second and fourth poppet valves; and means for combining the inverted dither signal with the signals received by the pilot valves operating the first and third poppet valves, thereby preventing simultaneous opening of the poppet valves associated with out-of-phase dither signals.

9. The invention of claim 5, wherein the deadband circuit comprises:

a first comparator having a bi-stable output, a first input receiving the deadband reference signal and a second input receiving the non-inverted error signal;

a second comparator having a bi-stable output coupled to the second input of the first comparator, a first input coupled to receive the deadband reference signal and a second input coupled to receive the inverted error signal; and integrator means for integrating the output of the first comparator.

[10. the invention of claim 1, wherein the control circuit comprises:

difference means for generating a non-inverted error signal representing a difference between the feedback and command signals;

inverting means for converting the error signal to an inverted error signal;

a first pair of driven circuits receiving the non-inverted error signal for driving a corresponding first pair of the pilot valves in response thereto; and a second pair of driver circuits receiving the inverted error signal for driving a corresponding second pair of the pilot valves in response thereto.]

[11. The invention of claim 10, wherein each driver circuit comprises:

modulating means for converting the received error signal to a pulse-width modulated driving signal having a duty cycle corresponding to the magnitude of the received error signal.]

12. The invention of claim [11] *22*, wherein the modulated driving signal generated by one of the driver circuits of the first pair of driver circuits is 180 degrees out of phase with the modulated driving signal generated by the other driving circuit of the first pair of driver circuits, and the modulated driving signal generated by one of the driver circuits of the second pair of driver circuits is 180 degrees out of phase with the modulated driving signal generated by the other of the second pair of driver circuits.

13. The invention of claim [10] *22*, further comprising:

operator-controlled means for generating a variable deadband reference signal;

a deadband circuit for receiving the non-inverted error signal, the inverted error signal and the deadband reference signal and for generating a deadband adjust signal as a function thereof;

means for combining the deadband adjust signal with the non-inverted error signal to provide a first combined signal which is received by one of the first pair of driver circuits; and means for combining the deadband adjust signal with the inverted error signal to provide a second combined signal which is received by one of the second pair of driver circuits.

14. The invention of claim [10] *22*, further comprising:

operator-controlled means for generating a float signal; and means for combining the float signal with signals received by all the driver circuits, thereby energizing a selected pair of the pilot valves to open a corresponding pair of the poppet valves controlling fluid communication between the sump and the cylinder, and thereby de-energizing a selected pair of the pilot valves to close a corresponding pair of the poppet valves controlling fluid communication between the pump and the cylinder.

15. The invention of claim [10] *22*, further comprising:

operator-controlled means for selectively generating a shutdown signal; and means for combining the shutdown signal with the signals received by all the driver circuits, generation of the shutdown signal causing de-energization of all the pilot valves to close all the poppet valves and prevent movement of the cylinders.

[16. The invention of claim 10, further comprising:

a dither oscillator for generating a dither signal having a predetermined frequency;

inverter means for converting the dither signal to an inverted dither signal which is 180 degrees out of phase with the dither signal;

means for combining the dither signal with the signals received by the pilot valves operating the second and fourth poppet valves; and means for combining the inverted dither signal with the signals received by the pilot valves operating the first and third poppet valves, thereby preventing simultaneous opening of the poppet valves associated with out-of-phase dither signals.]

17. The invention of claim 13, wherein the deadband circuit comprises:

a first comparator having a bi-stable output, a first input receiving the deadband reference signal and a second input receiving the non-inverted error signal;

a second comparator having a bi-stable output coupled to the second of the first comparator, a first input coupled to receive the deadband reference signal and a second input coupled to receive the inverted error signal; and integrator means for integrating the output of the first comparator.

[18. A control system for controlling a double-acting hydraulic cylinder having retraction and extension chambers separated by a piston in the cylinder, the control system comprising:

a first electrically controlled pressure-reducing valve having an inlet communicated with a pump and having an outlet communicated with the retraction chamber;

a second electrically controlled pressure-reducing valve having an inlet communicated with the retraction chamber and having an outlet communicated with a reservoir;

first check valve means for preventing fluid flow from the retraction chamber to the first valve;

a third electrically controlled pressure-reducing valve having an inlet communicated with the extension chamber and having an outlet communicated with the reservoir;

a fourth electrically controlled pressure-reducing valve having an inlet communicated with the pump and having an outlet communicated with the extension chamber;

second check valve means for preventing fluid flow from the extension chamber to the fourth valve;

operator-controlled means for generating a command signal representing a desired position of the piston relative to the cylinder;

position-sensing means for generating a feedback signal representing an actual position of the piston relative to the cylinder, and a control circuit including means for generating error signals representing a difference between the feedback and command signals and means for applying the error signals to selected ones of the electrically controlled valves to control the position of the piston relative to the cylinder.]

[19. The invention of claim 18, wherein each electrically controlled valve comprises:

a pilot-operated proportional-type poppet valve and a solenoid-controlled pilot valve for operating the poppet valve.]

20. A control system for a hydraulic system including a pump, a reservoir, a double-acting cylinder having a piston movable therein and four electrically and independently operable valves for controlling fluid communication between the cylinder, the pump and the reservoir, the control system comprising:

position sensing means for generating a feedback signal indicative of a sensed position of the piston relative to the cylinder;

a command signal indicative of a desired position of the piston relative to the cylinder;

first difference means for generating a first error signal representing a difference between the feedback and command signals;

differentiating means for converting the feedback signal to a velocity signal indicative of the rate of change of the position of the piston relative to the cylinder;

second difference means for generating a second error signal representing a difference between the first error signal and the velocity signal;

inverting means for converting the second error signal to an inverted error signal;

a first pair of driver circuits, each receiving the second error signal and coupled to a corresponding first pair of the four valves to operate the first pair of valves in response to the second error signal to control movement of the piston relative to the cylinder in a first direction; and a second pair of driver circuits, each receiving the inverted error signal and coupled to a second pair of the four valves to operate the second pair of valves in response to the inverted error signal to control movement of the piston relative to the cylinder in the second direction.

*21. A system for controlling a double-acting hydraulic cylinder having extension and retraction chambers separated by a piston in the cylinder, comprising:*

*a valve assembly comprising a first pilot-operated proportional-type poppet valve for controlling fluid communication between pump and the retraction chamber, a second pilot-operated proportional-type poppet valve for controlling fluid communication between the retraction chamber and a reservoir, a third pilot-operated proportional-type poppet valve for controlling fluid communication between the extension chamber and the reservoir and a fourth pilot-operated proportional-type poppet valve for controlling fluid communication between the pump and the extension chamber;*

*a plurality of solenoid-operated pilot valves, each pilot valve operating one of the poppet valves;*

*position-sensing means for sensing the position of the cylinder and for generating a feedback signal indicative thereof;*

*operator-controlled means for generating a command signal representing a desired position of the piston relative to the cylinder; and*

*control circuit means for generating an error signal derived from the feedback and command signals and for energizing selected ones of the pilot valves to operate corresponding ones of the poppet valves to move the cylinder and reduce the magnitude of the error signal, the control circuit comprising:*

*differentiating means for converting the feedback signal to a velocity signal indicative of the velocity of the piston relative to the cylinder;*

*difference means for generating the error signal representing a difference between the command and feedback signals;*

*means for generating a compensated error signal representing a difference between the error signal and the velocity signal;*

*inverting means for converting the compensated error signal to an inverted compensated error signal;*

*a first pair of driver circuits receiving the compensated error signal for driving a corresponding first pair of the pilot valves in response thereto; and*

*a second pair of driver circuits receiving the inverted compensated error signal for driving a corresponding second pair of the pilot valves in response thereto.*

*22. A system for controlling a double-acting hydraulic cylinder having extension and retraction chambers separated by a piston in the cylinder, comprising:*

*a valve assembly comprising a first pilot-operated proportional-type pressure-reducing poppet valve for controlling fluid communication between pump and the retraction chamber, a second pilot-operated proportional-type pressure-reducing poppet valve for controlling fluid communication between the retraction chamber and a reservoir, a third pilot-operated proportional-type pressure-reducing poppet valve for controlling fluid communication between the extension chamber and the reservoir and a fourth pilot-operated proportional-type pressure-reducing poppet valve for controlling fluid communication between the pump and the extension chamber;*

*a plurality of solenoid-operated pilot valves, each pilot valve operating one of the poppet valves;*

*position-sensing means for sensing the position of the cylinder and for generating a feedback signal indicative thereof; operator controlled means for generating a command signal representing a desired position of the piston relative to the cylinder;*

*control circuit means for generating an error signal derived from the feedback and command signals and for energizing selected ones of the pilot valve to operate corresponding ones of the poppet valves to move the cylinder and reduce the magnitude of the error signal;*

*the control circuit means comprising a first pair of driver circuits for driving a corresponding first pair of the pilot valves in response to the error signal, and a second pair of driver circuits for driving a corresponding second pair of the pilot valves in response to the error signal;*

*each driver circuit comprising modulating means for converting the error signal to a pulse-width modulated*

*driving signal having a duty cycle corresponding to the magnitude of the error signal; and*

*the control circuit further comprising:*

*a dither oscillator for generating a dither signal having a predetermined frequency;*

*inverter means for converting the dither signal to an inverted dither signal which is 180 degrees out of phase with the dither signal;*

*means for combining the dither signal with the pulse-width modulated driving signal received by the pilot valves operating the second and fourth poppet valves; and*

*means for combining the inverted dither signal with the pulse-width modulated driving signal received by the pilot valves operating the first and third poppet valves, thereby preventing simultaneous opening of the poppet valves associated with out of phase dither signals.*

* * * * *

UNITED STATES PATENT AND TRADEMARK OFFICE

CERTIFICATE OF CORRECTION

PATENT NO. : Re. 33,846

DATED : 17 March 1992

INVENTOR(S) : Kenneth Dee Kramer et al.

It is certified that error appears in the above-identified patent and that said Letters Patent is hereby corrected as shown below:

In Col. 9, line 27, insert -- operator-controllable command means for generating -- before "a".

In Col. 10, line 58, delete "valve" and insert -- valves --.

Signed and Sealed this

Third Day of August, 1993

*Attest:*

*Attesting Officer*

Michael K. Kirk

MICHAEL K. KIRK

*Acting Commissioner of Patents and Trademarks*